United States Patent
Koshiji et al.

(10) Patent No.: US 11,811,454 B2
(45) Date of Patent: Nov. 7, 2023

(54) LOCAL WAVELENGTH DEFRAG APPARATUS, LOCAL WAVELENGTH DEFRAG METHOD AND PROGRAM

(71) Applicant: NIPPON TELEGRAPH AND TELEPHONE CORPORATION, Tokyo (JP)

(72) Inventors: Kojun Koshiji, Musashino (JP); Yasuharu Kaneko, Musashino (JP); Mika Ishizuka, Musashino (JP); Seisho Yasukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 60 days.

(21) Appl. No.: 17/597,577

(22) PCT Filed: Aug. 13, 2019

(86) PCT No.: PCT/JP2019/031851
§ 371 (c)(1),
(2) Date: Jan. 12, 2022

(87) PCT Pub. No.: WO2021/029013
PCT Pub. Date: Feb. 18, 2021

(65) Prior Publication Data
US 2022/0263578 A1 Aug. 18, 2022

(51) Int. Cl.
*H04B 10/27* (2013.01)
*H04B 10/572* (2013.01)
*H04J 14/02* (2006.01)

(52) U.S. Cl.
CPC ........... *H04B 10/27* (2013.01); *H04B 10/572* (2013.01); *H04J 14/02* (2013.01)

(58) Field of Classification Search
CPC .. H04B 10/27; H04B 10/572; H04B 10/0795; H04J 14/02; H04J 14/0257; H04J 14/025;
(Continued)

(56) References Cited

U.S. PATENT DOCUMENTS

2012/0237212 A1* 9/2012 Nishihara ........... H04J 14/0213
398/83
2013/0336655 A1* 12/2013 Grobe .................... H04J 14/025
398/67

(Continued)

OTHER PUBLICATIONS

Akihiro Kadohata et al, "Path accommodation design engine that designs a multilayer network with high reliability and simplicity", NTT Technology Journal, vol. 28, No. 5, 2016.

(Continued)

*Primary Examiner* — Hibret A Woldekidan
(74) *Attorney, Agent, or Firm* — IPUSA, PLLC

(57) ABSTRACT

A local wavelength defragmentation apparatus performs wavelength defragmentation for at least one wavelength path passing through a target link in an optical transmission network. The local wavelength defragmentation apparatus includes a reallocation rank determination unit configured to calculate a remaining time from a present time to an abolition timing for each of the at least one wavelength path and determine rank for wavelength reallocation of the at least one wavelength path based on the remaining time; and a reallocation number determination unit configured to calculate utilization of at least one reallocatable wavelength number for each of the at least one wavelength path according to the rank, and determine a wavelength so that a wavelength of the wavelength number having the highest utilization is reallocated.

7 Claims, 18 Drawing Sheets

(58) Field of Classification Search
CPC . H04J 14/0213; H04J 14/0227; H04J 14/0241
See application file for complete search history.

(56) References Cited

U.S. PATENT DOCUMENTS

| | | | |
|---|---|---|---|
| 2017/0230113 A1* | 8/2017 | Takita | H04B 10/07953 |
| 2018/0026716 A1* | 1/2018 | Takita | H04B 10/572 |
| | | | 398/82 |
| 2018/0083698 A1* | 3/2018 | Hino | H04J 14/0213 |
| 2022/0014275 A1* | 1/2022 | Tojo | H04J 14/02 |

OTHER PUBLICATIONS

Akihiro Kadohata et al., "Wavelength Defrag Scheme Based on Wavelength Path Resource Management", IEICE Technical Report, pp. 53-58, vol. 113, No. 175, 2013.

* cited by examiner

Fig. 7

| WAVELENGTH NUMBER | ALLOCATION DATE AND TIME | UTILIZATION SERVICE | START NODE | END NODE | PASSAGE LINK 1 | PASSAGE NODE 1 | PASSAGE LINK 2 | PASSAGE NODE 2 | ... | PASSAGE NODE 7 |
|---|---|---|---|---|---|---|---|---|---|---|
| 1 | 2018/1/23 13:00 | A | N8 | N9 | L12 | | | | | |
| 2 | 2018/12/23 12:55 | B | N4 | N9 | L6 | N5 | L9 | N8 | | |
| ... | | | | | | | | | | |
| 6 | 2019/2/23 18:40 | A | N8 | N9 | | | | | | |

Fig. 8

| WAVELENGTH NUMBER | LINK L1 | LINK L2 |
|---|---|---|
| 1 | 1 | 1 |
| 2 | 0 | 1 |
| ... | ... | ... |
| 6 | 1 | 0 |

⋮

| | LINK L10 | LINK L11 | LINK L12 |
|---|---|---|---|
| | 0 | 0 | 1 |
| | 0 | 0 | 1 |
| | ... | ... | ... |
| | 0 | 0 | 1 |

Fig. 9

| ALLOCATION DATE AND TIME | ABOLITION DATE AND TIME | UTILIZATION SERVICE | START NODE | END NODE | PASSAGE LINK 1 | PASSAGE NODE 1 | PASSAGE LINK 2 | PASSAGE NODE 2 | ... | PASSAGE NODE 7 |
|---|---|---|---|---|---|---|---|---|---|---|
| 2017/1/11 12:00 | 2017/7/1 10:00 | A | N8 | N9 | L12 | | | | | |
| 2017/2/21 10:10 | 2017/5/31 17:00 | B | N4 | N9 | L6 | N5 | L9 | N8 | | |

Fig. 13

| WAVELENGTH NUMBER | ALLOCATION DATE AND TIME | UTILIZATION SERVICE | START NODE | END NODE | PASSAGE LINK 1 | PASSAGE NODE 1 | PASSAGE LINK 2 | PASSAGE NODE 2 | PASSAGE NODE 7 |
|---|---|---|---|---|---|---|---|---|---|
| 1 | 2018/7/23 13:00 | A | N8 | N9 | L12 | | | | |
| 4 | 2018/12/23 12:55 | A | N7 | N6 | L11 | N8 | L12 | N9 | L10 |
| 5 | 2019/2/23 18:40 | A | N7 | N9 | L11 | N8 | L12 | | |

Fig. 14

| NO. | ALLOCATION DATE AND TIME | ABOLITION DATE AND TIME | TIME TO ABOLITION [DAY] |
|---|---|---|---|
| 1 | 2018/5/5 18:34 | 2019/4/14 18:30 | 344 |
| 2 | 2018/6/12 19:28 | 2019/6/13 19:30 | 366 |
| 3 | 2018/6/1 19:29 | 2019/6/29 19:59 | 393 |
| 4 | 2018/5/22 20:07 | 2019/4/23 18:35 | 336 |
| 5 | 2018/5/7 19:52 | 2019/4/20 19:43 | 348 |
| 6 | 2018/6/11 18:59 | 2019/6/9 18:46 | 363 |
| 7 | 2018/5/20 18:46 | 2019/5/23 19:35 | 368 |
| 8 | 2018/6/15 20:12 | 2019/6/11 19:54 | 361 |
| 9 | 2018/6/22 19:51 | 2019/4/14 18:56 | 296 |
| 10 | 2018/5/29 19:17 | 2019/5/18 19:10 | 354 |
| 11 | 2018/5/6 19:31 | 2019/4/10 19:46 | 339 |
| 12 | 2018/6/14 18:37 | 2019/5/1 19:06 | 321 |

Fig. 16

| WAVELENGTH NUMBER | L1 | L2 | L3 | L4 | L5 | L6 | L7 | L8 | L9 | L10 | L11 | L12 |
|---|---|---|---|---|---|---|---|---|---|---|---|---|
| 1 | 1 | 1 | 0 | 1 | 1 | 1 | 0 | 0 | 0 | 0 | 0 | 1 |
| 2 | 0 | 1 | 0 | 0 | 1 | 0 | 0 | 0 | 1 | 0 | 0 | 0 |
| 3 | 0 | 0 | 0 | 1 | 1 | 0 | 0 | 0 | 1 | 1 | 1 | 0 |
| 4 | 0 | 1 | 0 | 0 | 1 | 0 | 0 | 1 | 1 | 1 | 1 | 1 |
| 5 | 1 | 1 | 1 | 0 | 0 | 0 | 1 | 1 | 0 | 0 | 1 | 1 |
| 6 | 0 | 0 | 0 | 0 | 1 | 1 | 1 | 1 | 0 | 0 | 0 | 0 |

0: FREE, 1: IN USE, BOLD: DEFRAGMENTATION TARGET WAVELENGTH PATH

Fig. 17

| WAVELENGTH NUMBER | L1 | L2 | L3 | L4 | L5 | L6 | L7 | L8 | L9 | L10 | L11 | L12 |
|---|---|---|---|---|---|---|---|---|---|---|---|---|
| 1 | 2 | 2 | 0 | 1 | 2 | 1 | 0 | 0 | 0 | 0 | 0 | 1 |
| 2 | 0 | 2 | 0 | 0 | 2 | 0 | 0 | 0 | 1 | 0 | 0 | 0 |
| 3 | 0 | 0 | 0 | 3 | 1 | 0 | 0 | 0 | 1 | 1 | 1 | 0 |
| 4 | 0 | 2 | 0 | 0 | 1 | 0 | 0 | 1 | 1 | 2 | 2 | 2 |
| 5 | 1 | 1 | 1 | 0 | 0 | 0 | 1 | 1 | 0 | 0 | 3 | 3 |
| 6 | 0 | 0 | 0 | 0 | 1 | 1 | 1 | 1 | 0 | 0 | 0 | 0 |

*0: FREE WAVELENGTH, BOLD: DEFRAGMENTATION TARGET WAVELENGTH PATH

Fig. 18

| L1 | L2 | L3 | L4 | L5 | L6 | L7 | L8 | L9 | L10 | L11 | L12 |
|----|----|----|----|----|----|----|----|----|-----|-----|-----|
| 3  | 2  | 2  | 2  | 1  | 2  | 1  | 1  | 1  | –   | –   | –   |

LOCAL WAVELENGTH DEFRAG APPARATUS, LOCAL WAVELENGTH DEFRAG METHOD AND PROGRAM

TECHNICAL FIELD

The present invention relates to a wavelength defragmentation technique in an optical transmission network.

BACKGROUND ART

The optical transmission network has a wavelength continuity constraint by which a wavelength path must use the same wavelength from a start node to an end node. In recent years, there has been an increasing need to satisfy the wavelength continuity constraint for wavelength allocation in the optical transmission network.

For this reason, in order to satisfy the wavelength continuity constraint, various heuristic wavelength allocation techniques have been proposed such as a First Fit method (FF method) for allocating a wavelength path in ascending order of wavelength number (from smaller number) and a least fragmentation method (LF method) in consideration of a utilization situation of the wavelength number of an adjacent link for minimizing fragmentation (NPL 1).

However, because a generation pattern of wavelength demand varies depending on factors such as a timing and a path, it is difficult to keep a continuous free wavelength for all wavelength demands. For this reason, a wavelength defragmentation technique for optimizing the wavelength allocation over the entire optical transmission network has been proposed (NPL 2).

The related art (wavelength defragmentation technique) is a technique for reallocating a wavelength having a less allocated number to a more allocated number so that each wavelength has a more allocated number for the entire optical transmission network. Details are as described in NPL 2. This makes it possible to suppress fragmentation of the wavelength allocation of the entire optical transmission network.

CITATION LIST

Non Patent Literature

NPL 1: Kadohata, et al., "Path accommodation design engine for simply and reliably designing multi-layer transport networks", NTT Technology Journal, May 2016.

NPL 2: Kadohata, et al., "Wavelength defrag scheme based on wavelength path resource management", PN 2013-17, pp. 53-58, Technical Report Order Information of The Institute of Electronics, Information and Communication Engineers, August 2013.

SUMMARY OF THE INVENTION

Technical Problem

The related art considers only how much the wavelength number is allocated (the allocation ratio of the wavelength number) in the entire optical transmission network, so that the wavelength number allocation is optimized only at the moment when the wavelength defragmentation is executed. For this reason, importance of the wavelength path based on attribute information such as the utilization service of the wavelength path, and possibility that the wavelength path will be eliminated in the future are not considered.

Accordingly, the allocation situation of the wavelength number in consideration of attribute information such as the utilization service and the wavelength reallocation in consideration of the free wavelength available in the future by abolition are required in order to improve the effect of optimization.

Furthermore, in the related art, the wavelength reallocation is executed for only some wavelength paths. For this reason, after the execution, the free wavelength is not available in the continuous wavelength number. In order to achieve an operation applying a flex grid technique or the like that allocates a plurality of wavelength numbers to perform large-capacity communication, desirably the wavelength is reallocated so that the free wavelength is available by the continuous wavelength number.

In addition, in the practical operation of the optical transmission network, there are many cases where reliability is prioritized, so that it is difficult to apply the related art. The reason is that the uninterrupted wavelength defragmentation can be technically possible, but an operation method that does not take risk is adopted in view of increasing social impact when the wavelength defragmentation fails due to a human mistake or the like.

On the other hand, in tams of the reliability, periodic work is not performed until a plan for cutting the optical transmission network is made in advance to suppress problems due to aging or the like of equipment constituting the optical transmission network. The periodic work is performed locally in rotation for the entire optical transmission network. Accordingly, when the wavelength defragmentation is executed, desirably the wavelength defragmentation is adjusted to the timing of the periodic work or the like in which the cutting of the optical transmission network is previously found.

The present invention has been made in view of the above points, and an object of the present invention is to provide a technique that enables the wavelength reallocation of a wavelength path passing through a link that becomes the wavelength defragmentation target by the periodic work or the like, according to the remaining time of the wavelength path and the utilization of the wavelength number in the link.

Means for Solving the Problem

The disclosed technique provides a local wavelength defragmentation apparatus that performs wavelength defragmentation for at least one wavelength path passing through a target link in an optical transmission network. The local wavelength defragmentation apparatus includes: a reallocation rank determination unit configured to calculate a remaining time from a present time to an abolition timing for each of the at least one wavelength path and determine rank for wavelength reallocation of the at least one wavelength path based on the remaining time; and a reallocation number determination unit configured to calculate utilization of at least one reallocatable wavelength number for each of the at least one wavelength path according to the rank, and determine a wavelength so that a wavelength of the wavelength number having the highest utilization is reallocated.

Effects of the Invention

According to the disclosed technique, the technique that enables the wavelength reallocation of a wavelength path passing through a link that becomes the wavelength defragmentation target by the periodic work or the like, according to the remaining time of the wavelength path and the utilization of the wavelength number in the link.

BRIEF DESCRIPTION OF DRAWINGS

FIG. 7 is a diagram illustrating an example of storage information related to the link L12 of wavelength attribute information DB.

FIG. 8 is a diagram illustrating an example of storage information of a wavelength allocation management DB.

FIG. 9 is a diagram illustrating an example of storage information of a wavelength utilization history DB.

FIG. 13 is a diagram illustrating attribute information of wavelength paths in a specific example.

FIG. 14 is a diagram illustrating a specific example of historical information for wavelength paths having attributes equivalent to a defragmentation target.

FIG. 16 is a diagram illustrating a specific example of the wavelength utilization situation of each link in the whole optical transmission network.

FIG. 17 is a diagram illustrating a specific example of importance of the wavelength paths in each link.

FIG. 18 is a diagram illustrating a specific example of the distance of the wavelength path having a wavelength number 4.

DESCRIPTION OF EMBODIMENTS

Hereinafter, an embodiment of the present invention (the present embodiment) will be described with reference to the drawings. The embodiments to be described below are merely exemplary and embodiments to which the present invention is applied are not limited to the following embodiments.

In the embodiment, in management of the free wavelength and the wavelength path of the optical transmission network, the wavelength defragmentation is executed to the wavelength path passing through a periodic work target section at the timing of the periodic work or the like in which the cutting of the optical transmission network is scheduled in advance, in consideration of the attribute of the utilization service and the remaining time until the abolishment of the wavelength path. The technique will be described in detail below. In the embodiment, "wavelength path" refers to a transmission path that connects a path from a start node to an end node with a wavelength of light.

System Configuration

Figure 1:
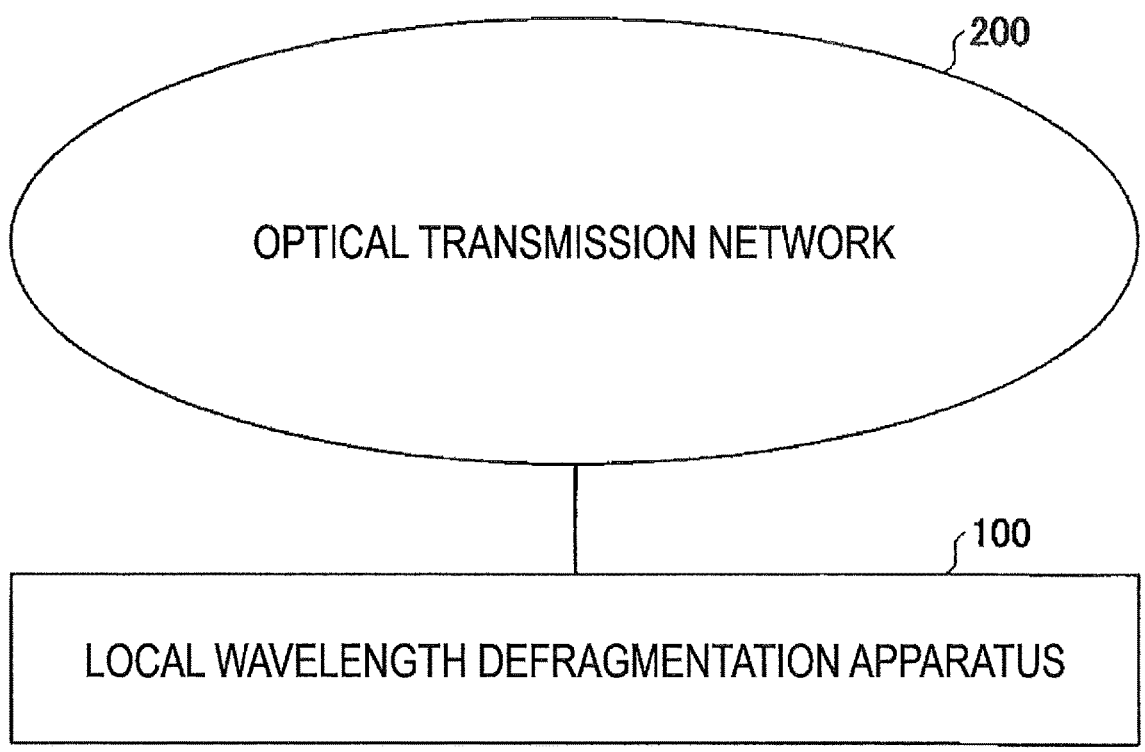
FIG. 1 is an entire configuration diagram of a system according to an embodiment of the present invention.

FIG. 1 is an entire configuration diagram of a system according to an embodiment of the present invention. As illustrated in FIG. 1, the system has a local wavelength defragmentation apparatus 100 and an optical transmission network 200.

The optical transmission network 200 is a trunk network such as an IP communication network that implements communication by an optical signal. The local wavelength defragmentation apparatus 100 is an apparatus that includes functions based on a technique of the present invention.

Figure 2:
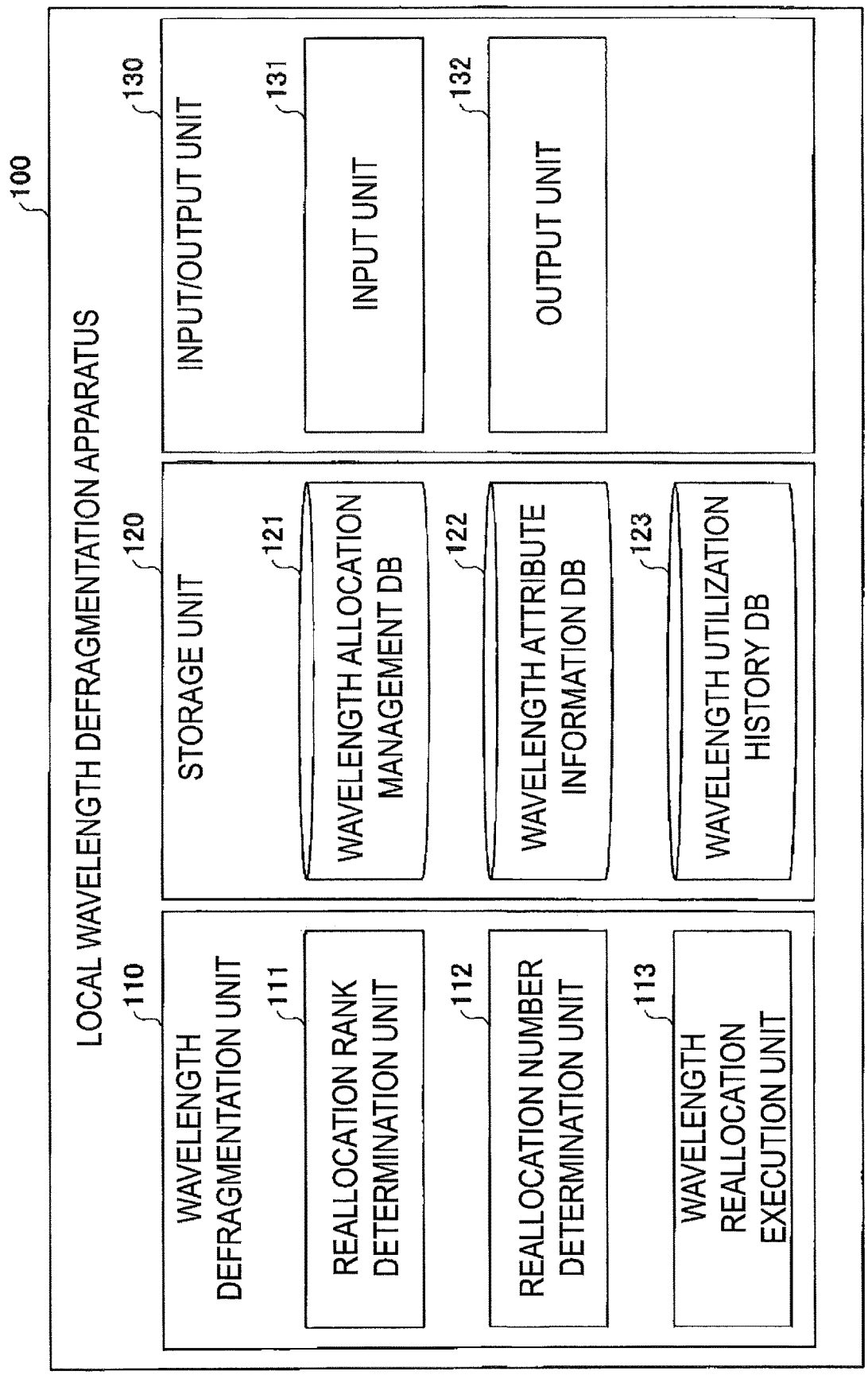
FIG. 2 is a configuration diagram of a local wavelength defragmentation apparatus.

FIG. 2 is a functional configuration diagram of the local wavelength defragmentation apparatus 100. As illustrated in FIG. 2, the local wavelength defragmentation apparatus 100 includes a wavelength defragmentation unit 110, a storage unit 120, and an input/output unit 130.

The wavelength defragmentation unit 110 includes a reallocation rank determination unit 111, a reallocation number determination unit 112, and a wavelength reallocation execution unit 113. The storage unit 120 has a wavelength allocation management DB 121, a wavelength attribute information DB 122, and a wavelength utilization history DB 123. The input/output unit 130 includes an input unit 131 and an output unit 132.

The functional configuration in FIG. 2 is merely an example. Any functional configuration that can perform the present invention may be adopted. The local wavelength defragmentation apparatus 100 may be physically implemented as a single device, or may be an apparatus configured by a plurality of physically separated devices connected to a network. The local wavelength defragmentation apparatus 100 may be implemented in a virtual machine on the cloud. The local wavelength defragmentation apparatus 100 may also be referred to as a local wavelength defragmentation system 100.

The function of each units is as follows. An outline will be described first, and then an example will be described in detail using specific examples.

Each Function of Wavelength Defragmentation Unit 110

Based on information of the wavelength attribute information DB 122 described below, the reallocation rank determination unit 111 determines priorities about which rank of the wavelength path corresponds to the wavelength number of a reallocation destination in reallocating each wavelength of the wavelength path passing through the link of the wavelength defragmentation target based on the information of the wavelength attribute information DB described later.

The reallocation number determination unit 112 determines which wavelength number is reallocated for each wavelength presently allocated to the wavelength path based on the reallocation rank and the information about the wavelength attribute information DB 122 or the wavelength allocation management DB 121. The wavelength reallocation execution unit 113 executes the wavelength reallocation based on a plan such as the periodic work.

Storage Unit 120

The wavelength allocation management DB 121 stores the allocation situation of the wavelength of each link constituting the optical transmission network 200. The wavelength attribute information DB 122 stores attribute information such as a setting timing of a wavelength path, path information, utilization service, and a wavelength number allocated to the wavelength path. The wavelength utilization history DB 123 stores historical information such as the setting timing or an abolition timing of the wavelength path, the path information, the utilization service, and the wavelength number allocated to the wavelength path.

Input/output Unit 130

The input unit 131 is a functional unit for inputting a link of a wavelength reallocation target or for inputting whether the wavelength reallocation can be executed. The output unit 132 outputs an execution result of each unit of the wavelength defragmentation unit 110 and information about each DB of the storage unit 120.

Example of Hardware Configuration

For example, the local wavelength defragmentation apparatus 100 can be implemented by causing a computer to execute a program describing details of processing contents of the embodiment.

That is, the local wavelength defragmentation apparatus 100 can be implemented by executing a program corresponding to processing performed by the local wavelength defragmentation apparatus 100 using hardware resources such as a central processing unit (CPU) and a memory embedded in a computer. The program can be recorded on a computer-readable recording medium (a portable memory or the like) to be stored or distributed. The program can also be provided via a network such as the Internet or an electronic mail.

Figure 3:
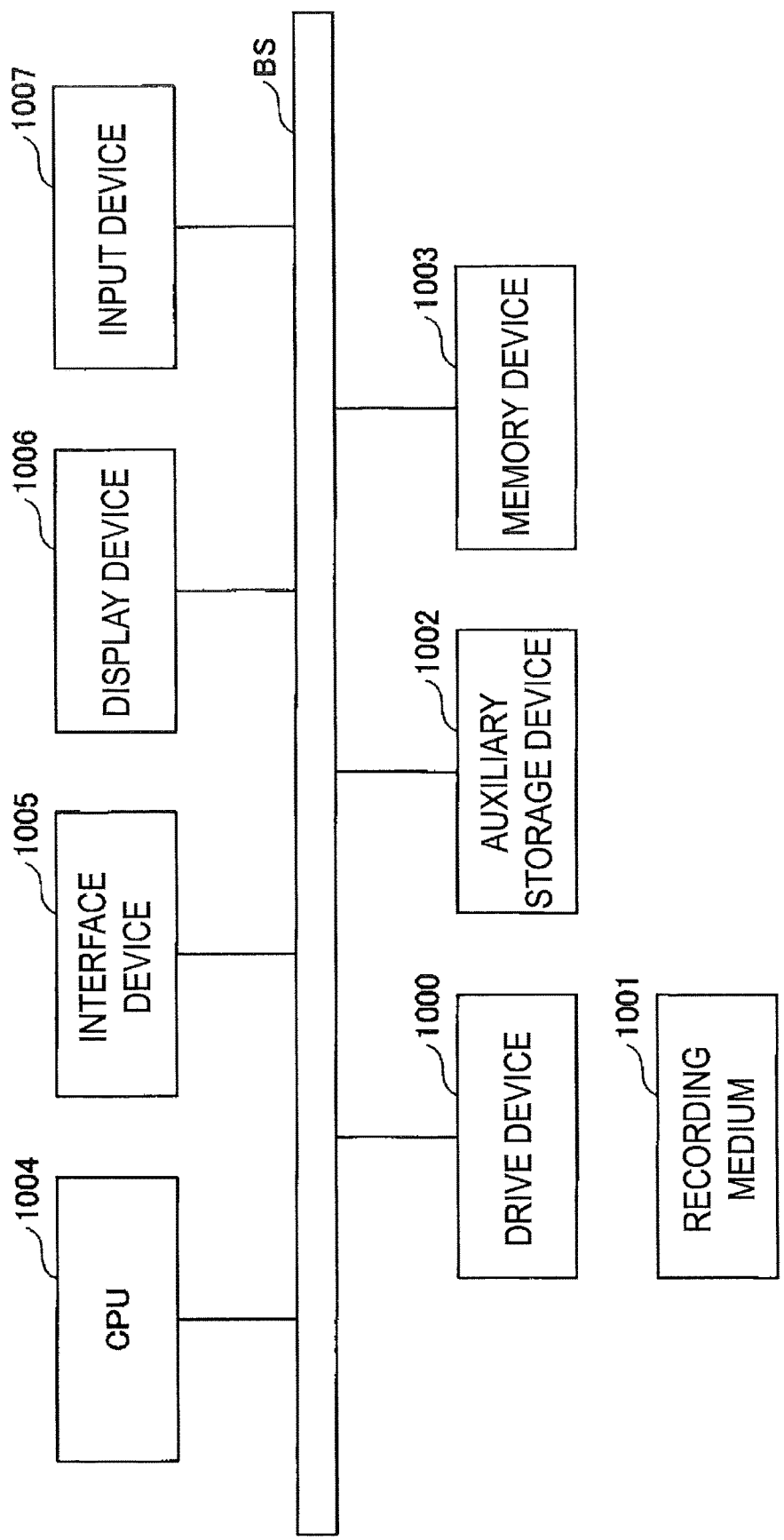
FIG. 3 is a diagram illustrating a hardware configuration example of the apparatus.

FIG. 3 is a diagram illustrating a hardware configuration example of the aforementioned computer according to the present embodiment. The computer in FIG. 3 includes a drive device 1000, an auxiliary storage device 1002, a memory device 1003, a CPU 1004, an interface device 1005, a display device 1006, and an input device 1007 connected to each other via a bus B.

A program for implementing processing in the computer is provided by, for example, the recording medium 1001 such as a compact disc read only memory (CD-ROM) or a memory card. When the recording medium 1001 that stores the program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores a necessary file, data, and the like.

The memory device 1003 reads the program from the auxiliary storage device 1002 and stores the program when an instruction to activate the program is given. The CPU 1004 implements a function of the local wavelength defragmentation apparatus 100 according to the program stored in the memory device 1003. The interface device 1005 is used as an interface connected to a network. The display device 1006 displays a graphical user interface (GUI) or the like according to a program. The input device 1007 includes a keyboard, a mouse, buttons, a touch panel, and the like, and is used to input various operation instructions.

EXAMPLE

Figure 4:
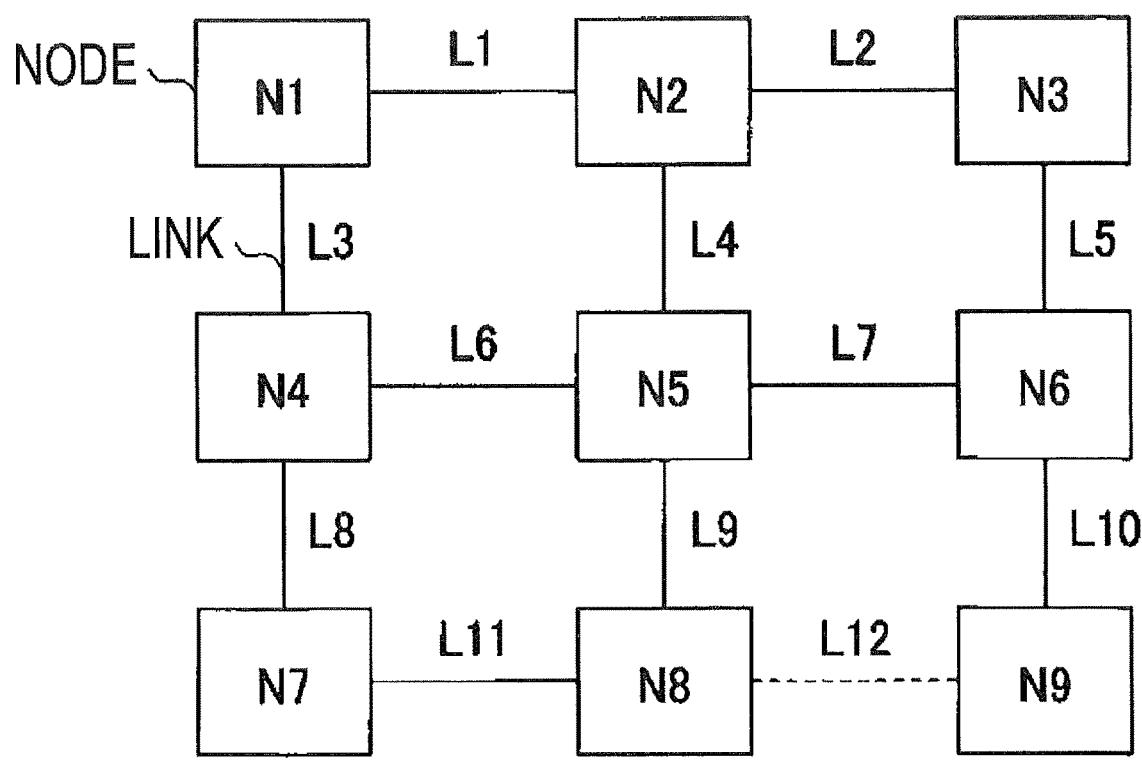
FIG. 4 is a diagram illustrating an entire configuration of an optical transmission network.

Hereinafter, processing operations of the local wavelength defragmentation apparatus 100 will be described in more detail using specific examples. FIG. 4 illustrates an entire configuration of the optical transmission network in a present example.

Figure 5:
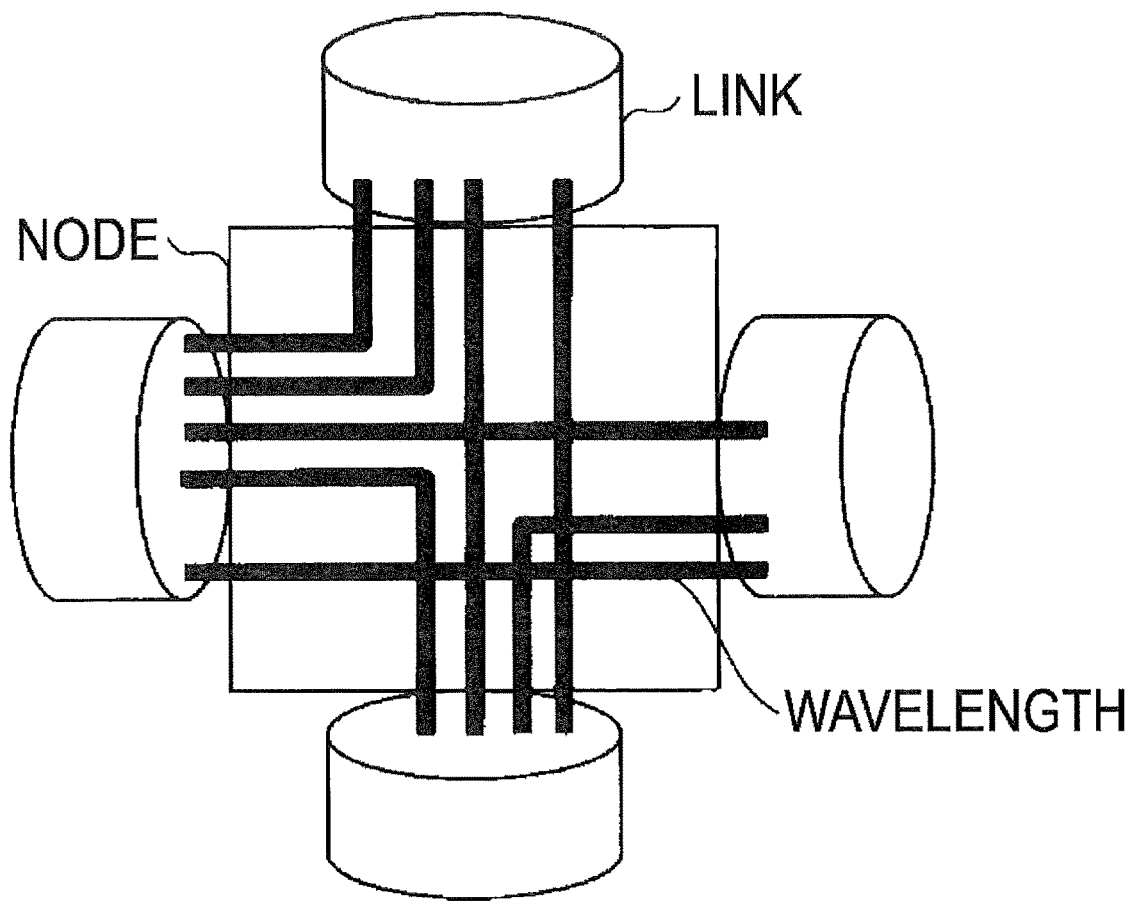
FIG. 5 is a diagram illustrating a wavelength allocation of a 4-degree node.

In the present example, the link L12 is assumed to be cut from the optical transmission network in FIG. 4 at the periodic work, and the wavelength defragmentation target is a link L12. The number of degrees of one node in the optical transmission network is at most four. In the case of the configuration of FIG. 4, only the node N5 has four degrees. FIG. 5 illustrates an image of wavelength allocation at 4-degree nodes.

Figure 6:
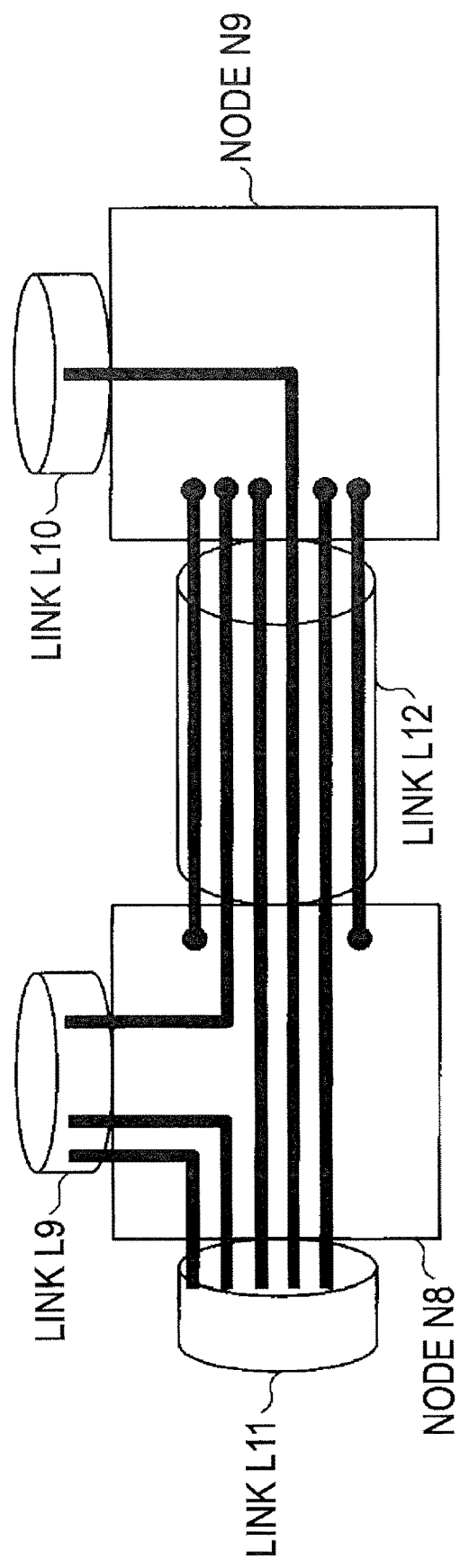
FIG. 6 is a diagram illustrating the allocation of the wavelength passing through a link L12.

In the present example, the wavelength allocation until the periodic work is executed is performed by an FF method as an example. FIG. 6 illustrates a wavelength allocation image for a wavelength path through a link L12.

FIG. 7 illustrates an example of attribute information for the wavelength path stored in the wavelength attribute information DB 121. In the example of FIG. 7, the wavelength number, allocation date and time, the utilization service, the start node, the end node, the passage link, and the passage node. However, the item and the storage format are not limited to the example of FIG. 7. A row of a wavelength number 1 in FIG. 7 indicates the attribute information of the wavelength path to which the wavelength of the wavelength number 1 is allocated among a plurality of wavelength paths passing through the link L12.

FIG. 8 illustrates an example of a wavelength allocation situation of each link constituting the optical transmission network, which is stored in the wavelength allocation management DB 121. In the example of FIG. 8, the presence or absence of the allocation to each link is represented by 1 and 0 respectively for each wavelength number. The item and the storage format are not limited to the example of FIG. 8. For example, it is illustrated that the wavelength of the wavelength number 1 is allocated to the link L1, the link L2, and the link L12.

FIG. 9 illustrates an example of historical information regarding a setting timing and an abolition timing of the wavelength path, which are stored in the wavelength utilization history DB 123. The item and the storage format are not limited to the example of FIG. 9.

The processing procedure of the local wavelength defragmentation apparatus 100 will be described below using a flowchart and a specific example.

Entire Processing Procedure

Figure 10:
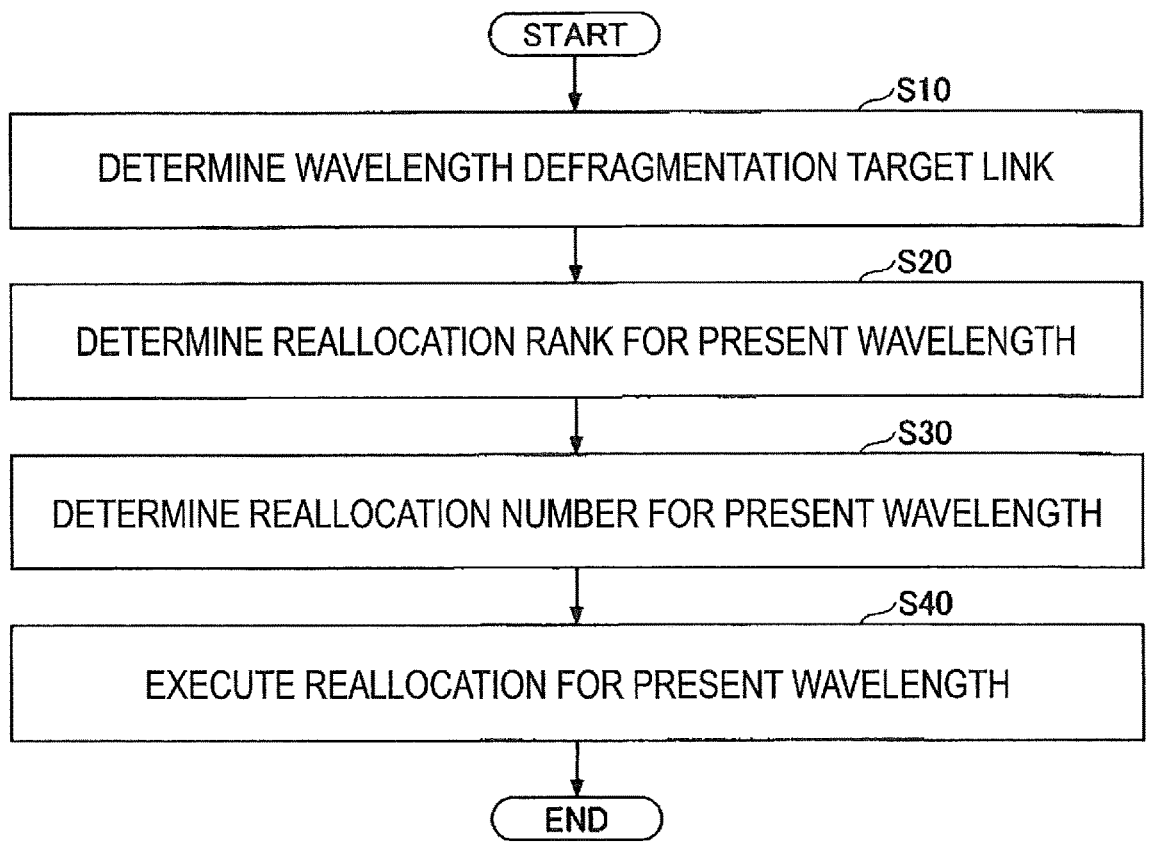
FIG. 10 is a flowchart illustrating an entire operations of the local wavelength defragmentation apparatus.

FIG. 10 is a flowchart illustrating overall operations of the local wavelength defragmentation apparatus 100. As illustrated in FIG. 10, in S10 (step 10), the local wavelength defragmentation apparatus 100 determines the target link that is the wavelength defragmentation target. As described above, in the present example, the link L12 becomes the target link.

In S20, the reallocation rank determination unit 111 determines the reallocation rank for one or more present wavelength paths going through the target link. In S30, the reallocation number determination unit 112 determines which wavelength number is reallocated in order of the reallocation rank determined in S20 from the highest ranked wavelength path. In S40, the wavelength reallocation execution unit 113 executes the wavelength reallocation of the wavelength path in accordance with the determination in S30. The wavelength reallocation in S40 may be performed by a common technique.

The determination of the reallocation rank for the current wavelength in S20 and the determination of the reallocation number for the current wavelength in S30 will be described in detail.

S20: Details of Determining of Reallocation Rank for Present Wavelength

In the present example, the reallocation rank determination unit 111 calculates the reallocation priority using the length of the remaining time until the abolition timing at which the presently-set wavelength path is not used and the length of the path (length of the wavelength path) in which the wavelength path passes from the start node to the end node as parameters for each wavelength path in the target link, and determines the reallocation rank. The parameters determining these priorities are examples and are not limited thereto. For example, the priorities may be calculated only by the remaining time.

More specifically, the reallocation rank determination unit 111 calculates the reallocation priority by multiplying the remaining time by the length of the wavelength path. However, the method for calculating the priority is not limited to this. In the present example, the remaining time to the abolition is estimated because it is assumed that the abolition timing is unknown, but if the abolition timing is clear, the estimation is unnecessary and the abolition timing can be used.

Figure 11:
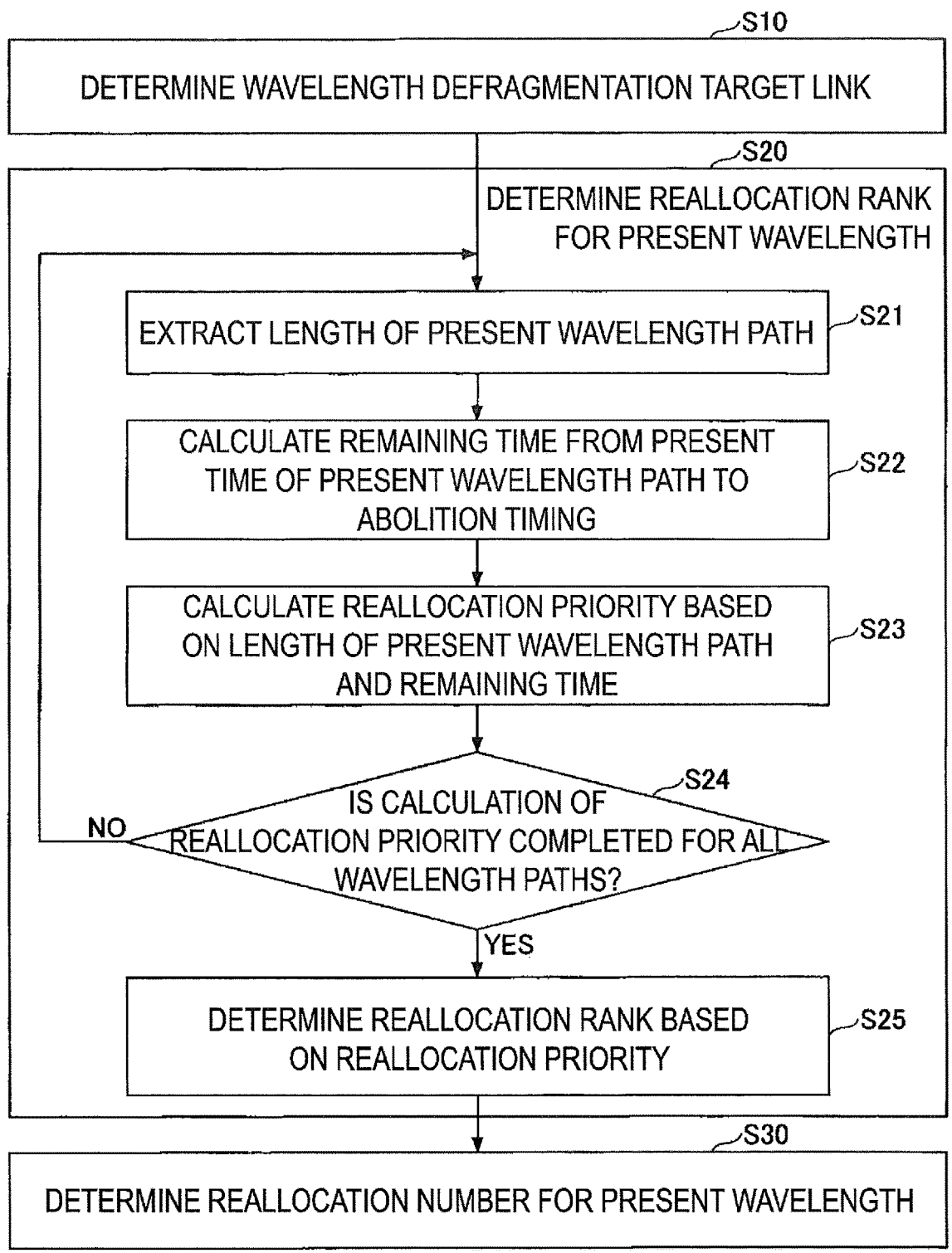
FIG. 11 is a flowchart illustrating operations of determining reallocation rank of a present wavelength.

FIG. 11 illustrates a flowchart illustrating operations of determining the reallocation rank of the present wavelength. As illustrated in FIG. 11, in S21, the reallocation rank determination unit 111 extracts the length of the present wavelength path to be processed in the target link. In S22, the reallocation rank determination unit 111 calculates the remaining time from the present time of the present wavelength path to the abolition timing.

In S23, the reallocation rank determination unit 111 calculates the reallocation priority based on the length of the present wavelength path and the remaining time. The reallocation rank determination unit 111 goes to S25 when the calculation of the reallocation priority is completed for all wavelength paths in the target link, and performs the processing from S21 for the next present wavelength path when not completed.

In S25, the reallocation rank determination unit 111 determines the reallocation rank based on the reallocation priority.

S22: Details of Method for Calculating Remaining Time to Abolition Timing

A method for calculating the remaining time to the abolition timing in S22 will be described in detail.

First, the reallocation rank determination unit 111 refers to the wavelength utilization history DB 123, classifies historical information regarding the setting timing and the abolition timing of the wavelength path by an attribute such as a utilization service, and calculates the n pieces of time data $t_n$ from the timing when the wavelength path is set to the abolition timing. Classifying by the attributes such as the utilization service is, for example, gathering attribute information of the same utilization service as the utilization service for the target wavelength path to calculate the time $t_n$ for them.

The reallocation rank determination unit 111 statistically analyzes the n pieces of time data $t_n$, and calculates an estimated time (time to abolition) from the timing when the wavelength path is set to the abolition timing. Any sample size n of the time data $t_n$ can be used for the statistical analysis. The specific estimation method of the time to abolition is described below, but the present invention is not limited thereto. The reallocation rank determination unit 111 subtracts an elapsed time from the present time to the setting timing of the wavelength path from the time to abolition, and sets the remaining time until abolishment of the wavelength path.

Examples of the method for estimating the time to abolition include Method a, Method b, and Method c described below.

Method a) In Method a, an average of n pieces of time data $t_n$ is referred to as time to abolition $t_e$ as indicated in the following equation.

$$t_e = \frac{\sum_i^n t_i}{n} \quad \text{[Math. 1]}$$

Method b) In Method b, based on the experience distribution function F(t) of the n pieces of time data $t_n$ illustrated below, numerical calculation for the time to abolition $t_e$ is performed or an approximation function for the experience distribution function F(t) is determined to calculate the time to abolition $t_e$ as an inverse function of the experience distribution function F(t).

$$F(t) = \frac{\#(1 \leq i \leq n \mid t_i \leq t)}{n} \quad \text{[Math. 2]}$$

A probability F(t) that the time to abolition $t_e$ becomes the time t is determined by a user who utilizes or operates the local wavelength defragmentation apparatus 100.

Method c) In Method c, It is assumed that n pieces of time data $t_n$ follow a certain probability distribution, and the time to abolition $t_e$ is numerically calculated based on the cumulative distribution function F(t). As an example, a probability distribution function F(t) in accordance with a normal distribution is as follows.

$$F(t) = \left(1 + \mathrm{erf}\frac{t-\mu}{\sqrt{2\sigma^2}}\right) \quad \text{[Math. 3]}$$

In the above equation, μ is an average of $t_n$ used to estimate the time to abolition $t_e$, and σ is a standard deviation of time $t_n$ used to estimate the time to abolition $t_e$.

Similarly to the method b, the probability F(t) in which the time to abolition $t_e$ becomes the time t is determined by a user who uses or operates the local wavelength defragmentation apparatus 100.

Specific Example of Reallocation Rank Determination

Figure 12:
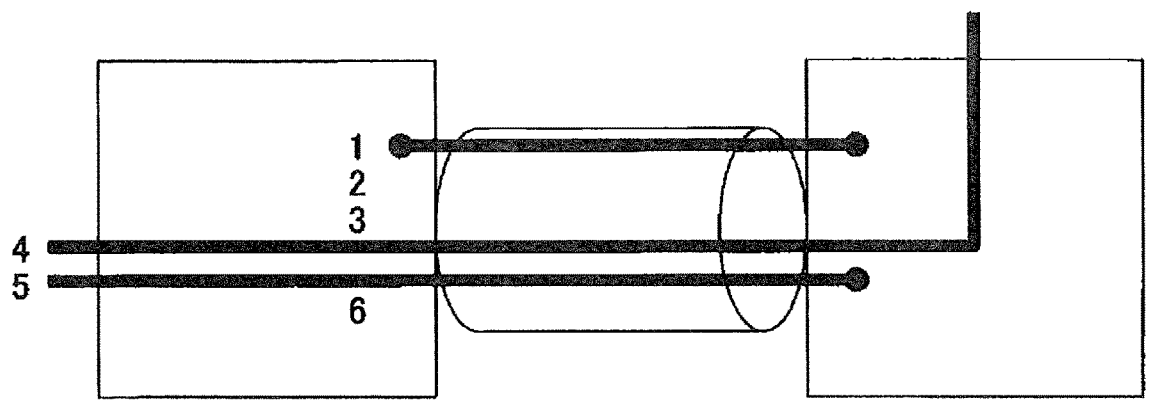
FIG. 12 is a diagram illustrating links of a wavelength defragmentation target in a specific example.

FIG. 12 illustrates an example of a wavelength accommodation situation of the link L12 that is the wavelength defragmentation target. As illustrated in FIG. 12, the number of wavelengths that can be accommodated in the link L12 is 6, and the wavelengths of the wavelength numbers 2, 3, 6 are free wavelengths. In addition, the time when the wavelength defragmentation is performed is set to 15:20, Jul. 3, 2019.

The attribute information of the wavelength paths of the wavelength defragmentation link L12 stored in the wavelength attribute information DB 122 is as illustrated in FIG. 13. FIG. 14 illustrates a specific example of the historical information (n=10) about the wavelength paths having attributes equivalent to the wavelength path passing through the wavelength defragmentation target link L12. In the specific example, the unit of the time to abolition is set to day, but may be set to hour, minute, or the like. For example, the equivalent attribute is the same utilization service.

When Method a described above (average value) is used in the method for estimating the time to abolition $t_e$, the time to abolition is determined as follows: $t_e=(t_1+t_2+ \ldots +t_{10})/10=349$ [days].

The elapsed time from the allocation date and time is calculated based on the allocation date and time and the present time (15:20, Jul. 3, 2019) in FIG. 13. In the specific example, the elapsed time of the wavelength path to which the wavelength number 1 is allocated is 345 days, the elapsed time of the wavelength path to which the wavelength number 2 is allocated is 192 days, and the elapsed time of the wavelength path to which the wavelength number 5 is allocated is 130 days.

Accordingly, the remaining time of each wavelength path is as follows: the wavelength path of the wavelength number 1: 349−345=4 days, the wavelength path of the wavelength number 4: 349−192=157 days, and the wavelength path of the wavelength number 5: 349−130=219 days.

In addition, when the length of the wavelength path is defined as the number of passage links, the length of the wavelength path to which the wavelength number 1 is allocated is 1, the length of the wavelength path to which the wavelength number 4 is allocated is 3, and the length of the wavelength path to which the wavelength number 5 is allocated is 2.

As described above, the reallocation priority of each wavelength path is as follows: the wavelength path of wavelength number 1: 4×1=4, the wavelength path of wavelength number 4: 157×3=471, and the wavelength path of wavelength number 5: 219×2=438. The higher the numerical value of the calculation result, the higher the priority. That is, the longer the remaining time, and the longer the wavelength path, the higher the reallocation priority (preferentially reallocated).

Accordingly, the reallocation rank for the present wavelength path is determined as follows: "the wavelength path to which the wavelength number 4 is allocated→the wavelength path to which the wavelength number 5 is allocated→the wavelength path to which the wavelength number 1 is allocated".

S30: Details of Determination of Reallocation Number of Present Wavelength

Then, the processing contents for determining the reallocation number of the present wavelength in S30 will be described in detail. The reallocation number determination unit 112 determines which wavelength numbers is reallocated in order of the reallocation rank determined in S20 from the wavelength path having the highest relocation rank. The method for determining the reallocated wavelength number is described below, but the present invention is not limited thereto.

Figure 15:
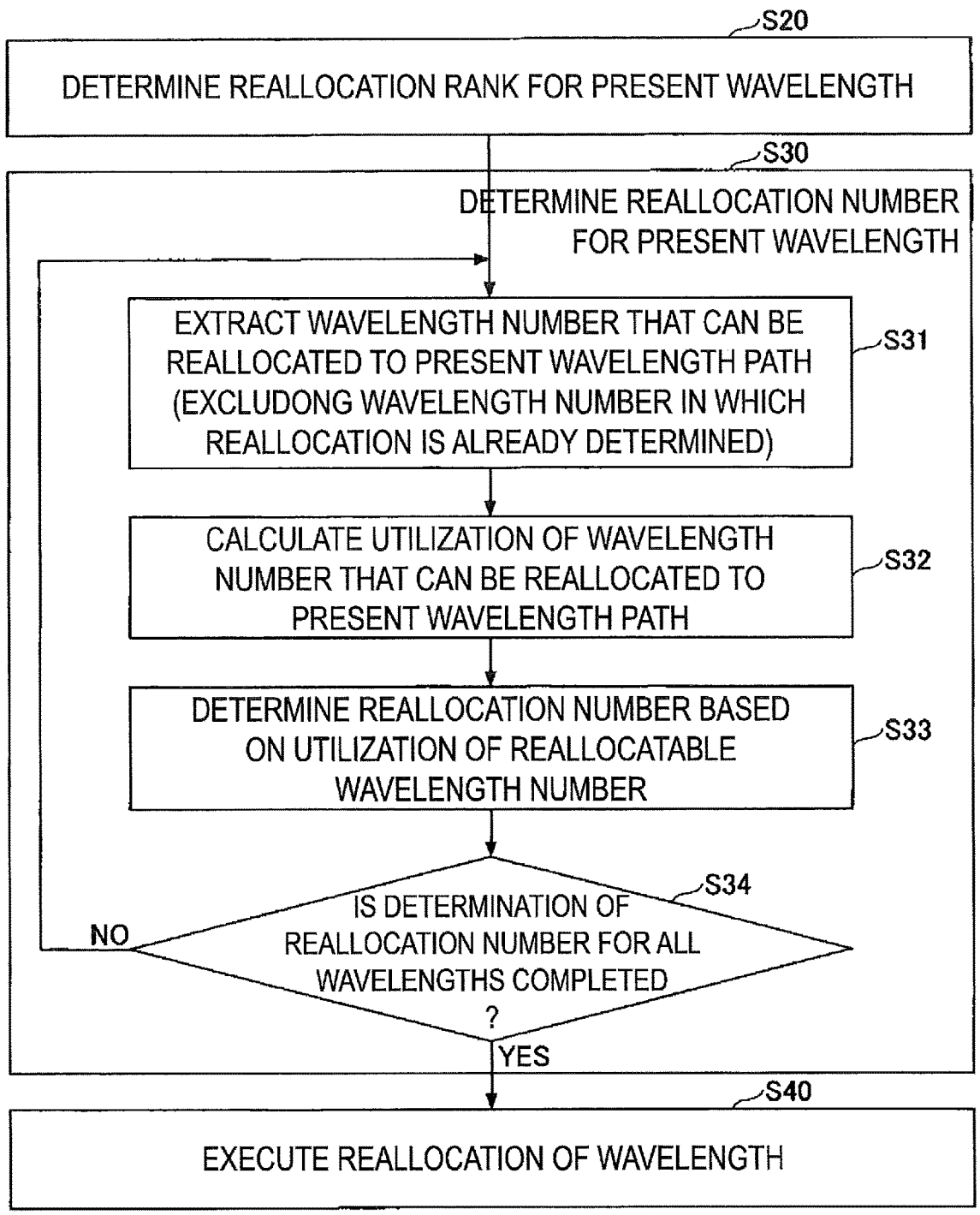
FIG. 15 is a flowchart illustrating operations of determining a reallocation number for the present wavelength.

FIG. 15 illustrates a flowchart illustrating operations of determining the reallocation number of the present wavelength. As illustrated in FIG. 15, in S31, the reallocation number determination unit 112 extracts the wavelength number that can be reallocated to the present wavelength path (excluding the wavelength number in which reallocation is already determined).

In S32, the reallocation number determination unit 112 calculates utilization of the wavelength number that can be reallocated to the present wavelength path. In S33, the reallocation number determination unit 112 determines the reallocation number of the present wavelength path based on the utilization of the reallocatable wavelength number. The reallocation number determination unit 112 goes to S40 when the determination of the reallocation number for all the present wavelength paths in the target link is completed, and performs the processing from S31 for the next present wavelength path when not completed. Details of each processing will be described below.

S31: Details of Extraction of Reallocatable Wavelength Number

The reallocation number determination unit 112 compares path information about the present wavelength path that is the defragmentation target stored in a wavelength attribute information DB 122 and the wavelength utilization situation in the entire optical transmission network stored in a wavelength allocation management DB 121, and extracts the reallocatable wavelength number.

The wavelength number extracted here is not limited to the wavelength number that can be allocated to the same path as the wavelength path of the defragmentation target. In actual operation, because there are various requirements such as "pass is designated", "shortest path is required", and the like, the availability of an alternative pass is determined in consideration of such requirements and the reallocatable wavelength number is extracted.

S32, S33: Details of Calculation of Utilization and Reallocation Number Determination The reallocation number determination unit 112 calculates, for each wavelength number that can be reallocated for the wavelength path of the object, the utilization of the wavelength number in the entire optical transmission network excluding the wavelength path of the wavelength defragmentation target.

For the calculation of the utilization in the present example, the simplest method is such that the wavelength number of each link is evaluated using a binary value of "used=1" and "unused=0" to set the binary value to a cumulative value of this evaluation value. This method may be used. In this method, the relationship between the wavelength path of the wavelength defragmentation target and each link is uniform.

However, strength of the relationship varies depending on the attributes such as a physical distance and the utilization service of the wavelength path passing through the link. In the present example, the utilization is calculated in the following procedures of i to iv in consideration of the strength of such the relationship. However, the parameters and the calculation method used in calculating the utilization are not limited thereto.

i) The wavelength number of each link excluding the link through which the wavelength path of the wavelength defragmentation target passes is evaluated using the binary value of "used=1" and "unused=0".

ii) A coefficient weighting the evaluation values of the procedure i is determined based on the attribute information of the wavelength path to which the wavelength number is allocated in each link excluding the link through which the wavelength path of the wavelength defragmentation target passes. In the present example, the evaluation value is weighted using the utilization service and the remaining time. However, the weighting may be performed using only the utilization service or only the remaining time.

For example, when there are three types of utilization services of A, B, and C and the importance of the utilization service is increased by the order of A→C, the importance of A is set to 1, the importance of B is set to 2, the importance of C is set to 3, and the importance is set to a weighting factor.

The estimation of the remaining time is performed in the same manner as S20 for the wavelength path to which the wavelength number of each link except the wavelength path of the wavelength defragmentation target is allocated. Then, a difference value between this remaining time and the remaining time of the wavelength path of the wavelength defragmentation target is calculated. An inverse of the difference value is set to the weighting coefficient. Using the inverse of the difference value as the weighting coefficient, the wavelength paths near the remaining time are easily allocated to the same wavelength number.

iii) A distance between each link excluding the link through which the wavelength defragmentation target wavelength path passes and the wavelength path is calculated using the shortest path. When the wavelength path spans a plurality of links, the distance between the closest link of the plurality of links and the wavelength path is calculated by the shortest path.

iv) Results of multiplying the evaluation value of i by the importance of ii and the inverse of the difference value and dividing by the distance of iii are summed for each link. The result is the utilization of the wavelength number.

The reallocation number determination unit 112 determines the wavelength number having the highest utilization calculated as described above as the reallocation wavelength number for the present wavelength path of the target. When a plurality of the wavelength numbers having the same utilization exist, the smaller number is prioritized. When a plurality of paths including the same path and alternative paths exist with the same utilization and the same wavelength number, the same path is prioritized. When the utilization and the wavelength number are the same, but the same path does not exist, and the plurality of alternative paths exist, the shortest path is prioritized.

Specific example of Reallocation Number Determination

A specific example of the method for determining the reallocation number intended to the above example in FIGS. 12 and 13 will be described. In this case, for convenience of explanation, the extracted wavelength number is limited to the wavelength number allocated to the same path as the target wavelength path. The wavelength utilization situation of each link of the entire optical transmission network in the specific example is as illustrated in FIG. 16.

As described above, in the specific example of S20, the priority rank is determined in the following order: "the wavelength path to which the wavelength number 4 is allocated→the wavelength path to which the wavelength number 5 is allocated→the wavelength path to which the wavelength number 1 is allocated". And thus, the reallocation number determination unit 112 determines the reallocation number in this order.

According to the wavelength utilization situation in FIG. 16, candidates for the reallocation number of the wavelength path to which the wavelength of the wavelength number 4 is allocated are the wavelength numbers 1, 2, 4, 5, 6. Here, in all of the links (L10, L11, L12) through which the wavelength path passes, the wavelength number that is not allocated to the wavelength path that is not the defragmentation target is extracted as the candidate. In the wavelength number 3, the links L10, L11 are allocated to the wavelength paths that are not the defragmentation target. For this reason, the wavelength number 3 does not become the candidate of the wavelength number of the reallocation destination. The reallocation number may be the same as the present allocation number.

In the present example, FIG. 17 illustrates the value of the wavelength utilization situation of each link in the entire optical transmission network that is replaced by "utilization situation×importance" when three types of utilization services exist and their importance is 1, 2, or 3. In this case, the remaining time is not considered, and the weighting coefficient of the remaining time is set to 1.

In addition, the distance of each link with respect to the wavelength path of the wavelength number 4 that is the defragmentation target is as illustrated in FIG. 18 (the number of links including this link is the distance to the wavelength path of the defragmentation target).

The utilization of the wavelength number of the entire optical transmission network is a total value of "utilization situation of each link×importance÷distance to defragmentation target path" for the links excluding the link through which the wavelength path of the defragmentation target passes. Thus, in the case of the wavelength number 1, from FIG. 17 and FIG. 18, the utilization is $2/3+1+1/2+2+1/2=4.67$. In the similar calculation, the utilization of the wavelength number 2 is 4, the utilization of the wavelength number 4 is 4, the utilization of the wavelength number 5 is 3.33, and the utilization of the wavelength number 6 is 3.5.

Thus, the wavelength number 1 is the most likely candidate for the reallocation number for the wavelength path to which the wavelength number 4 is allocated. However, presently, the wavelength number 1 is allocated to another wavelength path of the defragmentation target. The procedure in which the wavelength number is changed with the wavelength number 4 is used in order to avoid the ability reallocating the wavelength number in the wavelength path.

As illustrated in FIG. 16, the link other than the link through which the wavelength path of the defragmentation target to which wavelength number 4 is allocated passes is not included in the link through which the wavelength path of the defragmentation target to which the wavelength number 1 is allocated passes (even when included, the free wavelength that is not utilized can be changed). Accordingly, the wavelength path of the defragmentation target to which the wavelength number 1 is allocated is changeable with the wavelength number 4.

Consequently, the reallocation number for the wavelength path to which the wavelength number 4 is allocated is determined to be the wavelength number 1. Then, the reallocation number of the wavelength path to which the wavelength number 5 is allocated is determined, and finally the reallocation number of the wavelength path to which the wavelength number 1 is allocated is determined. However, the wavelength number for which the reallocation is determined (in this case, the wavelength number 1) is excluded from the candidates of the reallocation destination. The determination method is the same as the method for determining the reallocation number of the wavelength path to which wavelength number 4 is allocated.

Effects of Embodiment

As described above, in the embodiment, the defragmentation (local defragmentation) of the wavelength path passing through a section to be the target of the periodic work can be performed at the timing such as the periodic work in which the cutting of the link in the optical transmission network is scheduled in advance. This may satisfy practical operation requirements, such as avoiding the risk of the optical transmission network being disconnected during service offering.

In addition, in the embodiment, the rank of the reallocation is determined in consideration of the remaining time until the presently set wavelength path is abolished. This can manage the free wavelength and the wavelength path in consideration of the free wavelength that becomes available by the abolition. In addition, in the embodiment, all the wavelength paths passing through the section of the wavelength defragmentation target are reallocated in consideration of the remaining time and the magnitude of the wavelength number. As a result, the continuous wavelength numbers are available, and improvement in the application effect such as the flex grid technique can be expected. The reason why the continuous wavelength numbers are available is as follows.

Regarding the remaining time used as the parameter in the embodiment, the wavelength path having the longer remaining time tends to be allocated to a smaller number, and the wavelength path having the shorter remaining time tends to be reallocated to a larger number. Consequently, after the defragmentation, the wavelength paths are eliminated from the larger number as the time elapses, and the free wavelength is allowed to exist.

On the other hand, when the wavelength number is allocated to a new wavelength path, the wavelength number is commonly allocated by the FF method, and in the embodiment, the wavelength allocation until the periodic work is performed by the FF method. Consequently, the wavelength numbers are used from the smaller number, and the larger numbers are used later, and the larger numbers tend to be available.

Thus, when the larger numbers are used later and wavelength paths are abolished from the wavelength path in which the older wavelength number is allocated as the time elapses after the defragmentation, the free continuous wavelength number in the older number will be more likely to occur, which enables the continuous wavelength numbers available.

That is, in the embodiment, in the link that becomes the defragmentation target by the periodic work or the like, the remaining time to the abolition is obtained from the history of the wavelength path having the similar service attribute or the like based on the past history, and the reallocation is performed to the wavelength number having the highest utilization in the reallocatable wavelength number while the wavelength number having the longer remaining time and the longer wavelength path is reallocated with the higher priority. The utilization is a value which becomes larger as the importance of the service is larger, the remaining time and the wavelength path are longer, and the link near the wavelength path of defragmentation target is greater in the links in the entire optical transmission network. In other words, when each link is viewed across the entire network in the wavelength number, a large number of links are used in important services and the like, and the reallocation is performed so as to pack the wavelength numbers in which the links close to the wavelength path of the defragmentation target are often used.

This enables optimization in the future for the reallocation in consideration of the remaining time of the wavelength path, and the continuous wavelength numbers are available in order to pack and allocate the wavelength number having the high utilization, and the operation to which the flex grid technology is applied can be performed.

Supplement

In the embodiment, at least the local wavelength defragmentation apparatus, the local wavelength defragmentation method, and the program described in each section below are provided.

Item 1

A local wavelength defragmentation apparatus that performs wavelength defragmentation for at least one wavelength path passing through a target link in an optical transmission network, the local wavelength defragmentation apparatus including:

a reallocation rank determination unit configured to calculate a remaining time from a present time to an abolition timing for each of the at least one wavelength path and determine rank for wavelength reallocation of the at least one wavelength path based on the remaining time; and a reallocation number determination unit configured to calculate utilization of at least one reallocatable wavelength number for each of the at least one wavelength path according to the rank, and determine a wavelength so that a wavelength of the wavelength number having the highest utilization is reallocated.

Item 2

The local wavelength defragmentation apparatus according to item 1, wherein the reallocation rank determination unit estimates time to abolition from a time when a wavelength path of a calculation target of the remaining time is set to a time when the abolition is performed based on historical information about a plurality of wavelength paths having an attribute identical to the wavelength path of the calculation target of the remaining time, and calculates the remaining time based on a set timing, a present time, and the time to abolition of the wavelength path.

Item 3

The local wavelength defragmentation apparatus according to item 1 or 2, wherein the reallocation rank determination unit determines the rank based on a result of multiplying the remaining time and a length of the wavelength path.

Item 4

The local wavelength defragmentation apparatus according to any one of items 1 to 3, wherein the reallocation number determination unit calculates utilization of a wavelength number of the at least one wavelength path based on whether a reallocatable wavelength number is used in a link in the optical transmission network, importance of a wavelength path to which the reallocatable wavelength number is allocated, and a distance between the link and the wavelength path of a wavelength defragmentation target.

Item 5

The local wavelength defragmentation apparatus according to any one of items 1 to 4, wherein the reallocation number determination unit calculates, for the links excluding the wavelength path of the wavelength defragmentation target, an evaluation value indicating whether the reallocatable wavelength number is used, the importance of the wavelength path to which the reallocatable wavelength number is allocated, a difference value between the remaining time of the wavelength path to which the reallocatable wavelength number is allocated and the remaining time of the wavelength path of the wavelength defragmentation target, and the distance between the link and the wavelength path of the wavelength defragmentation target, calculates the utilization by summing up, for the links excluding the wavelength path of the wavelength defragmentation target, a result produced from dividing a product of multiplying the evaluation value, the importance and an inverse of the difference value.

Item 6

A local wavelength defragmentation method executed by a local wavelength defragmentation apparatus that performs wavelength defragmentation for at least one wavelength path passing through a target link in an optical transmission network, the local wavelength defragmentation method including:

calculating a remaining time from a present time to an abolition timing for each of the at least one wavelength path and determining rank for wavelength reallocation of the at least one wavelength path based on the remaining time; and calculating utilization of at least one reallocatable wavelength number for each of the at least one wavelength path according to the rank, and determining a wavelength so that a wavelength of the wavelength number having the highest utilization is reallocated.

Item 7

A program for causing a computer to function as an unit in the local wavelength defragmentation apparatus described in any one of items 1 to 5.

The present embodiments have been described above, but the present invention is not limited to the specific embodiments. Various modifications and changes can be made within the scope of the gist of the present invention described in the aspects.

REFERENCE SIGNS LIST

100 Local wavelength defragmentation apparatus
110 Wavelength defragmentation unit
111 Reallocation rank determination unit
112 Reallocation number determination unit
113 Wavelength reallocation execution unit
120 Storage unit
121 Wavelength allocation management DB
122 Wavelength attribute information DB
123 Wavelength utilization history DB
130 Input/output unit
131 Input unit
132 Output unit
200 Optical transmission network
1000 Drive device
1002 Auxiliary storage device
1003 Memory device
1004 CPU
1005 Interface device
1006 Display device
1007 Input device

The invention claimed is:

1. A local wavelength defragmentation apparatus that performs wavelength defragmentation for at least one wavelength path passing through a target link in an optical transmission network, the local wavelength defragmentation apparatus comprising:
a processor; and
a memory storing program instructions that cause the processor to:
calculate a remaining time from a present time to an abolition timing for each of the at least one wavelength path and determine rank for wavelength reallocation of the at least one wavelength path based on the remaining time;
calculate utilization of at least one reallocatable wavelength number for each of the at least one wavelength path according to the rank, and determine a wavelength so that a wavelength of the wavelength number having the highest utilization is reallocated, and
reallocate the wavelength of the wavelength number having the highest utilization.

2. The local wavelength defragmentation apparatus according to claim 1, wherein the processor estimates time to abolition from a time when a wavelength path of a calculation target of the remaining time is set to a time when the abolition is performed based on historical information about a plurality of wavelength paths having an attribute identical to the wavelength path of the calculation target of the remaining time, and calculates the remaining time based on a set timing, a present time, and the time to abolition of the wavelength path.

3. The local wavelength defragmentation apparatus according to claim 1, wherein processor determines the rank based on a result of multiplying the remaining time and a length of the wavelength path.

4. The local wavelength defragmentation apparatus according to claim 1, wherein the processor calculates utilization of a wavelength number of the at least one wavelength path based on whether a reallocatable wavelength number is used in a link in the optical transmission network, importance of a wavelength path to which the reallocatable wavelength number is allocated, and a distance between the link and the wavelength path of a wavelength defragmentation target.

5. The local wavelength defragmentation apparatus according to claim 1, wherein
the processor
calculates, for the links excluding the wavelength path of the wavelength defragmentation target,
an evaluation value indicating whether the reallocatable wavelength number is used,
importance of the wavelength path to which the reallocatable wavelength number is allocated,
a difference value between the remaining time of the wavelength path to which the reallocatable wavelength number is allocated and the remaining time of the wavelength path of the wavelength defragmentation target, and
a distance between the link and the wavelength path of the wavelength defragmentation target, and
calculates the utilization by summing up, for the links excluding the wavelength path of the wavelength defragmentation target, a result produced from dividing a product of multiplying the evaluation value, the importance, and an inverse of the difference value by the distance.

6. A local wavelength defragmentation method executed by a local wavelength defragmentation apparatus that performs wavelength defragmentation for at least one wavelength path passing through a target link in an optical transmission network, the local wavelength defragmentation method comprising:
calculating a remaining time from a present time to an abolition timing for each of the at least one wavelength path and determining rank for wavelength reallocation of the at least one wavelength path based on the remaining time;
calculating utilization of at least one reallocatable wavelength number for each of the at least one wavelength path according to the rank, and determining a wavelength so that a wavelength of the wavelength number having the highest utilization is reallocated, and
reallocating the wavelength of the wavelength number having the highest utilization.

7. A non-transitory computer-readable storage medium that stores therein a program for causing a computer for performing wavelength defragmentation for at least one wavelength path passing through a target link in an optical transmission network to perform a process comprising:
calculating a remaining time from a present time to an abolition timing for each of the at least one wavelength path and determining rank for wavelength reallocation of the at least one wavelength path based on the remaining time;
calculating utilization of at least one reallocatable wavelength number for each of the at least one wavelength path according to the rank, and determining a wavelength so that a wavelength of the wavelength number having the highest utilization is reallocated, and reallocating the wavelength of the wavelength number having the highest utilization.

* * * * *